United States Patent

Mizuta

[19]

[11] Patent Number: 6,049,595
[45] Date of Patent: Apr. 11, 2000

[54] MODEM APPARATUS WITH STORAGE MEANS FOR STORING COMMUNICATION PROGRAM, AND COMMUNICATION SYSTEM WITH MODEM APPARATUS

[75] Inventor: Masaharu Mizuta, Tokyo, Japan

[73] Assignee: Mitsubishi Denki Kabushiki Kaisha, Tokyo, Japan

[21] Appl. No.: 08/690,786

[22] Filed: Aug. 1, 1996

[30] Foreign Application Priority Data

Mar. 5, 1996 [JP] Japan .................................... 8-047392

[51] Int. Cl.[7] .............................. H04M 11/00; H04B 1/38
[52] U.S. Cl. ........................................ 379/93.05; 375/222
[58] Field of Search .............................. 379/93.05, 93.06, 379/93.07, 93.08, 93.28–93.34, 355; 340/825.34, 825.44; 375/222, 241, 242, 340; 358/438, 441, 442, 443

[56] References Cited

U.S. PATENT DOCUMENTS

| | | | |
|---|---|---|---|
| 4,982,423 | 1/1991 | Muroi ...................................... | 379/355 |
| 5,170,470 | 12/1992 | Pindar et al. ......................... | 379/93.28 |
| 5,301,246 | 4/1994 | Archibald et al. ........................ | 380/23 |
| 5,302,947 | 4/1994 | Fuller et al. . | |
| 5,430,793 | 7/1995 | Ueltzen et al. .......................... | 379/441 |
| 5,581,261 | 12/1996 | Hickman et al. ....................... | 379/441 |
| 5,594,952 | 1/1997 | Virtuoso et al. .......................... | 455/89 |
| 5,619,725 | 4/1997 | Gordon ................................... | 358/438 |
| 5,712,977 | 1/1998 | Glad et al. ............................ | 379/93.29 |
| 5,799,068 | 8/1998 | Kikinis et al. ........................ | 379/93.06 |

FOREIGN PATENT DOCUMENTS

| | | |
|---|---|---|
| 0628908 | 12/1994 | European Pat. Off. . |
| 7509082 | 10/1995 | Japan . |
| 2285558 | 12/1995 | United Kingdom . |

*Primary Examiner*—Curtis A. Kuntz
*Assistant Examiner*—George Eng

[57] ABSTRACT

A modem apparatus includes a modem circuit operatively connected to a control unit and a communication line. The modem circuit modulates a carrier signal so as to generate a modulated signal according to signal data inputted from the control unit, and transmits the modulated signal through the communication line. In addition, the modem circuit demodulates a modulated signal received through the communication line so as to generate signal data, and outputs the signal data to the control unit. A first memory stores a communication program to be executed by the control unit, and a second memory stores telephone number list data including a plurality of telephone numbers of further parties which are used when the communication program is executed. Further, an interface circuit connects the first memory, the second memory and the modem circuit to the control unit, and executes an interfacing process between the control unit and each of the first memory, the second memory and the modem circuit.

12 Claims, 11 Drawing Sheets

First Preferred Embodiment

Second Preferred Embodiment

MODEM APPARATUS WITH STORAGE MEANS FOR STORING COMMUNICATION PROGRAM, AND COMMUNICATION SYSTEM WITH MODEM APPARATUS

BACKGROUND OF THE INVENTION

1. Field of the Invention

The present invention relates to a modem apparatus, and a communication system comprising a modem apparatus, and in particular, relates to a modem apparatus which is connected to a control unit or controller of a portable personal computer or the like, including a storage device for storing a communication program for data communication, and performs data communication through a communication line such as a telephone line of a public switched telephone network (PSTN) or the like, and also relates to a communication system equipped with the modem apparatus.

2. Description of the Prior Art

Personal computer communications, such electronic mail by Internet and the like, are now very common as a result of the development of software such as Windows Ver. 3.1 and Windows 95 or the like as well as the improvement in higher processing speed of personal computers. In this case, the modem apparatus, which is a modulator and demodulator apparatus, plays an important role. In notebook type personal computers, slots of the personal computers and facsimile modem PC cards in compliance with the PCMCIA specifications are used in many cases.

FIG. 4 is a block diagram showing a communication system comprising a personal computer 1b, and an IC card (Integrated Circuit card) type modem apparatus (hereinafter, referred to as modem apparatus) 5b which is a so-called facsimile modem card. The modem apparatus 5b has, for example, a data communication function for performing data communication with a host computer of the other party for communication, as well as a facsimile function for executing facsimile communication with a facsimile apparatus of the other party. Hereinafter, each of the modem apparatuses 5, 5a and 5b has the data communication function and the facsimile function.

The personal computer 1b comprises:
  (a) a central processing unit (hereinafter, referred to as a CPU) 10;
  (b) a read only memory (hereinafter, referred to as a ROM) 11b;
  (c) a random access memory (hereinafter, referred to as a RAM) 12;
  (d) a hard disk memory 13;
  (e) a keyboard interface 14;
  (f) a display interface 15; and
  (g) a PCMCIA interface 16.

Further, a keyboard 2 and a CRT display 3 are connected to the personal computer 1b.

The modem apparatus 5b comprises:
  (a) a modem circuit 50 made up of a CPU 20, a ROM 21, and a RAM 22;
  (b) a network control unit circuit (hereinafter, referred to as an NCU circuit) 23;
  (c) a PCMCIA interface 24; and
  (d) an attribute memory 25 in which the card specifications of the modem apparatus 5b have previously been stored.

The modem apparatus 5b is connected to the personal computer 1b through a connector CN of the modem apparatus 5b so that the connector CN is coupled with a slot SL which is provided at an insertion hole (not shown) formed in a side face of the personal computer 1b. On the other hand, a modular connector MC to which a telephone line 6 is connected is coupled with a modular jack MJ which is provided to the modem apparatus 5b.

In the hard disk memory 13 of the personal computer 1b, there are stored, for example, software of a communication program for communication with an apparatus of the other party such as a host computer or the like, and a file with respect to a telephone number list of other parties.

When the modem apparatus 5b is inserted into the personal computer 1b, the personal computer 1b executes a card service process and a socket service process which have been known to those skilled in the art. In particular, the personal computer 1b accesses the attribute memory 25 to read out information stored therein, and links the read information with the communication program stored in the hard disk memory 13, so that the operator is allowed to carry out data processing, such as a personal computer communication or the like, which the operator wishes to execute.

In the communication system constructed as described above, for example, in order to carry out so called personal computer communication with a host computer, a communication program stored in the hard disk memory 13 is executed and the telephone number of the other party with which the operator communicates is designated out of a plurality of telephone numbers stored in the telephone number list of the other parties, and then, a call is originated toward a communication terminal of the other party. After the line connection with the apparatus of the other party is achieved, a data communication is executed.

The operator who wishes to communicate has a modem apparatus 5b of so-called facsimile modem PC card, and previously stores, in the hard disk memory 13 of the personal computer 1b, software of a communication program which he is acquainted with and accustomed to, and the telephone numbers of the other parties with which the operator wishes to communicate, and then, the operator can carry out the communication under the environment which the operator is acquainted with and accustomed to.

However, in the personal computer of any other person, there is often stored software of a communication program which is different from the communication program that the operator normally uses, as well as telephone numbers of other parties that the other person uses (a person who frequently uses the communication program may often store, for example, about 10 telephone numbers for data communication, 100 or more telephone numbers for facsimile communication, and about 100 telephone numbers for telephone). This leads to a problem that personal computer communication can not be performed as soon as the operator mounts his facsimile modem PC card into his personal computer. Further, although a method and an apparatus for loading a software program from a radio modem to an external computer is disclosed in the Japanese Patent Laid-Open Publication (Kouhyou) No. 7-509082, this publication does not disclose loading of any communication program, and therefore, the method and apparatus of the publication can not solve the above-mentioned problem.

SUMMARY OF THE INVENTION

An essential object of the present invention is therefore to provide a modem apparatus capable of easily and quickly performing personal computer communication when an operator carries an IC card type modem apparatus or the like and mounts the IC card type modem apparatus into a control unit or controller such as any personal computer which is compatible with the modem apparatus.

Another object of the present invention is to provide a modem apparatus capable of quickly performing personal computer communication under the environment which the operator is acquainted with and accustomed to, when an operator carries an IC card type modem apparatus or the like and mounts the IC card type modem apparatus into a control unit or controller such as any personal computer which is compatible with the modem apparatus.

A further object of the present invention is to provide a communication system equipped with a modem apparatus, capable of easily and quickly performing personal computer communication when an operator carries an IC card type modem apparatus or the like and mounts the IC card type modem apparatus into a control unit or controller such as any personal computer which is compatible with the modem apparatus.

A still further object of the present invention is to provide a communication system equipped with a modem apparatus, capable of quickly performing personal computer communication under the environment which the operator is acquainted with and accustomed to, when an operator carries an IC card type modem apparatus or the like and mounts the IC card type modem apparatus into a control unit or controller such as any personal computer which is compatible with the modem apparatus.

In order to achieve the above-mentioned objective, according to one aspect of the present invention, there is provided a modem apparatus that includes:

a modem circuit, operatively connected to a control unit and a communication line, for modulating a carrier signal so as to generate a modulated signal according to signal data inputted from the control unit and transmitting the modulated signal through the communication line, and for demodulating a modulated signal received through the communication line so as to generate signal data and outputting the signal data to the control unit. The modem apparatus includes a first storage device for storing a communication program executed by the control unit and;

a second storage device for storing telephone number list data including a plurality of telephone numbers of other parties which are used when the communication program is executed. The modem apparatus also includes an interface device for connecting the first storage device, said second storage device and said modem circuit to the control unit, and executing an interfacing process between each of the first storage device, the second storage device and the modem circuit, and the control unit.

The above-mentioned modem apparatus preferably further includes:

a third storage device for storing an initial operation program of the control unit for directly accessing the first and second storage devices of the modem apparatus, executing the communication program stored in the first storage device, and reading out the telephone number list data from the second storage device, The interface device connects the first storage device, the second storage device, the third storage device and the modem circuit, to the control unit, and executes an interfacing process between each of the first storage device, the second storage device, the third storage device and the modem circuit, and the control unit.

In the above-mentioned modem apparatus, the interface device preferably executes the interfacing process in compliance with PCMCIA specifications.

According to another aspect of the present invention, there is provided a communication system including:

a modem apparatus; and a control unit.

The modem apparatus includes:

a modem circuit, operatively connected to a control unit and a communication line, for modulating a carrier signal so as to generate a modulated signal according to signal data inputted from the control unit and transmitting the modulated signal through the communication line, and for demodulating a modulated signal received through the communication line so as to generate signal data. The signal data is outputted to the control unit. The modem apparatus also includes a first storage device for storing a communication program executed by the control unit;

a second storage device for storing telephone number list data including a plurality of telephone numbers of other parties which are used when the communication program is executed; and an interface device for connecting the first storage device, the second storage device and the modem circuit to the control unit, and executing an interfacing process between each of the first storage means, the second storage device and the modem circuit and the control unit.

The control unit includes:

a fourth storage device; and control means for reading out the communication program from the first storage device, reading out the telephone number list data from the second storage device, thereafter storing the communication program and the telephone number list data into the fourth storage device, and executing the communication program stored in the fourth storage device.

According to a further aspect of the present invention, there is provided a communication system including:

a modem apparatus; and a control unit.

Here, the modem apparatus includes:

a modem circuit, operatively connected to a control unit and a communication line, for modulating a carrier signal so as to generate a modulated signal according to signal data inputted the from the control unit and transmitting the modulated signal through the communication line, and for demodulating a modulated signal received through the communication line so as to generate signal data and outputting the signal data to said control unit. The modem apparatus also includes a first storage device for storing a communication program executed by said control unit;

a second storage device for storing telephone number list data including a plurality of telephone numbers of other parties which are used when the communication program is executed;

a third storage device for storing an initial operation program of the control unit for directly accessing the first and second storage devices of the modem apparatus, executing the communication program stored in the first storage device, and reading out the telephone number list data from the second storage device and;

an interface device for connecting the first storage device, the second storage device, the third storage device and the modem circuit, to the control unit, and executing an interfacing process between each of the first storage device, the second storage device, the third storage device and the modem circuit, and the control unit, The control unit includes:

a fourth storage device; and a control device for reading out the initial operation program from the third storage device, storing the initial operation program into the fourth storage device, executing the initial operation program, thereafter directly accessing the first and second storage devices, executing the communication program stored in the first storage device, and reading out the telephone number list data from the second storage device.

In the above-mentioned communication system, the interface device preferably executes the interfacing process in compliance with PCMCIA specifications.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention will be described below with reference to the attached drawings.

First Preferred Embodiment

Figure 1:
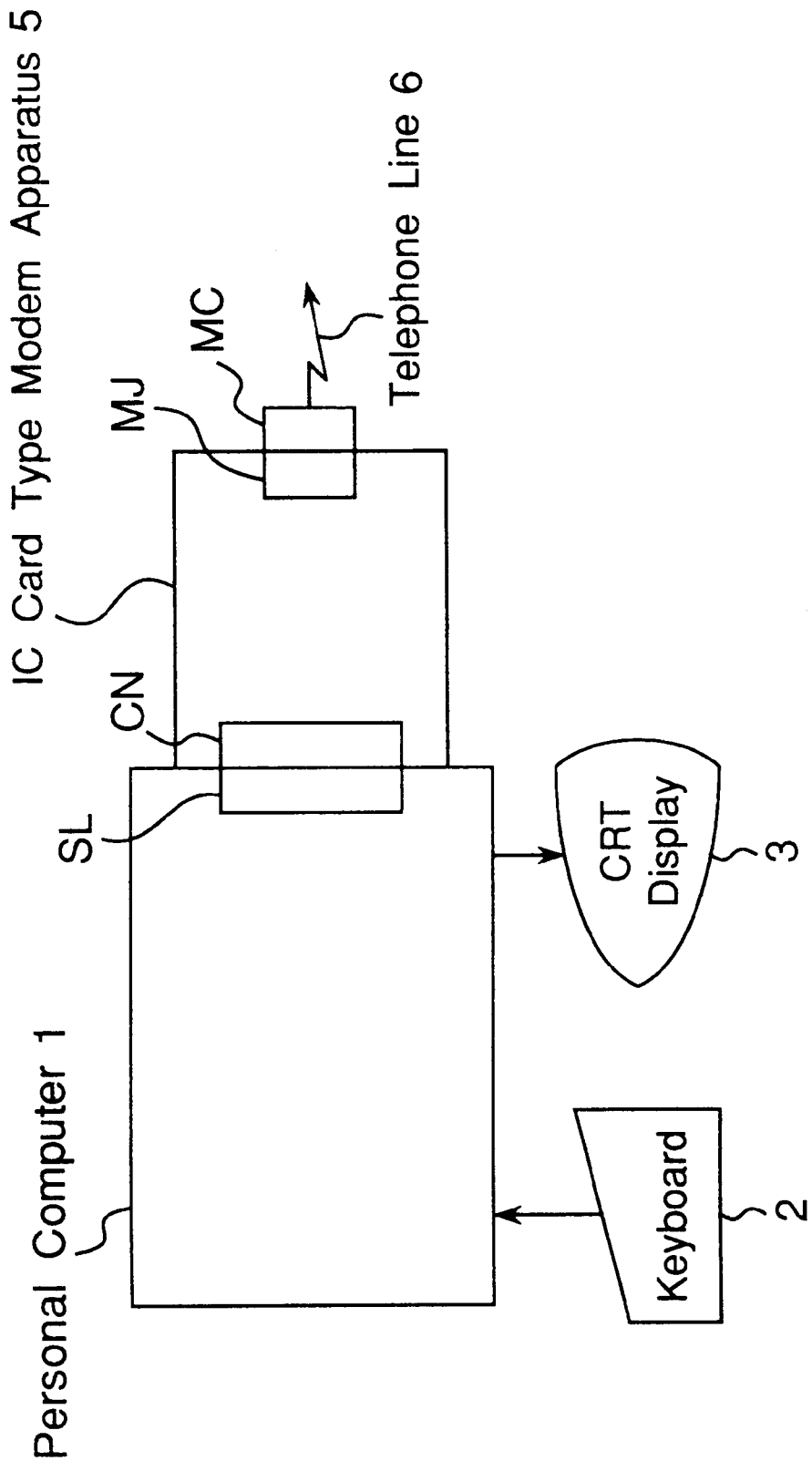
FIG. 1 is a block diagram showing a communication system which comprises a personal computer 1 and an IC card type modem apparatus 5, and which is a first preferred embodiment according to the present invention.
Figure 2:
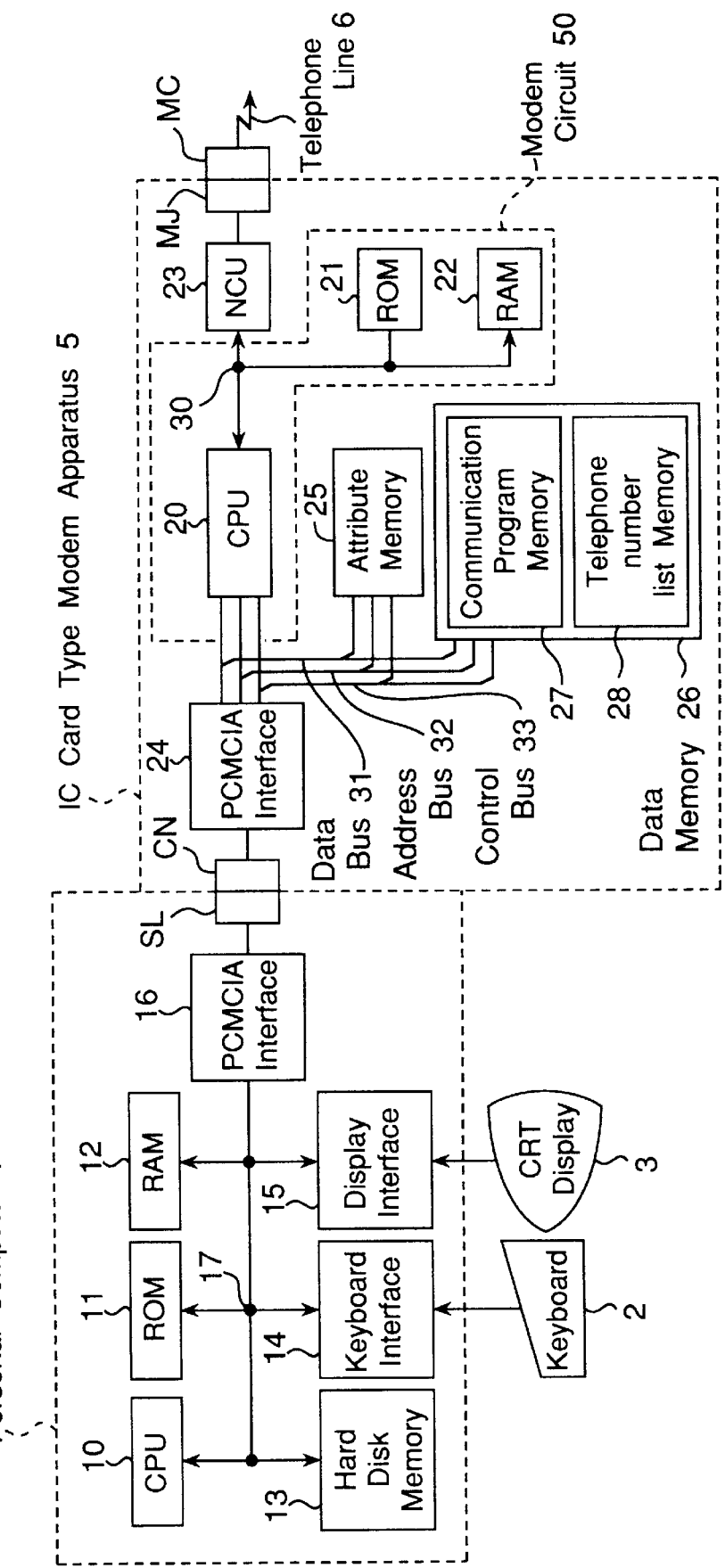
FIG. 2 is a block diagram showing details of the communication system of FIG. 1.
Figure 4:
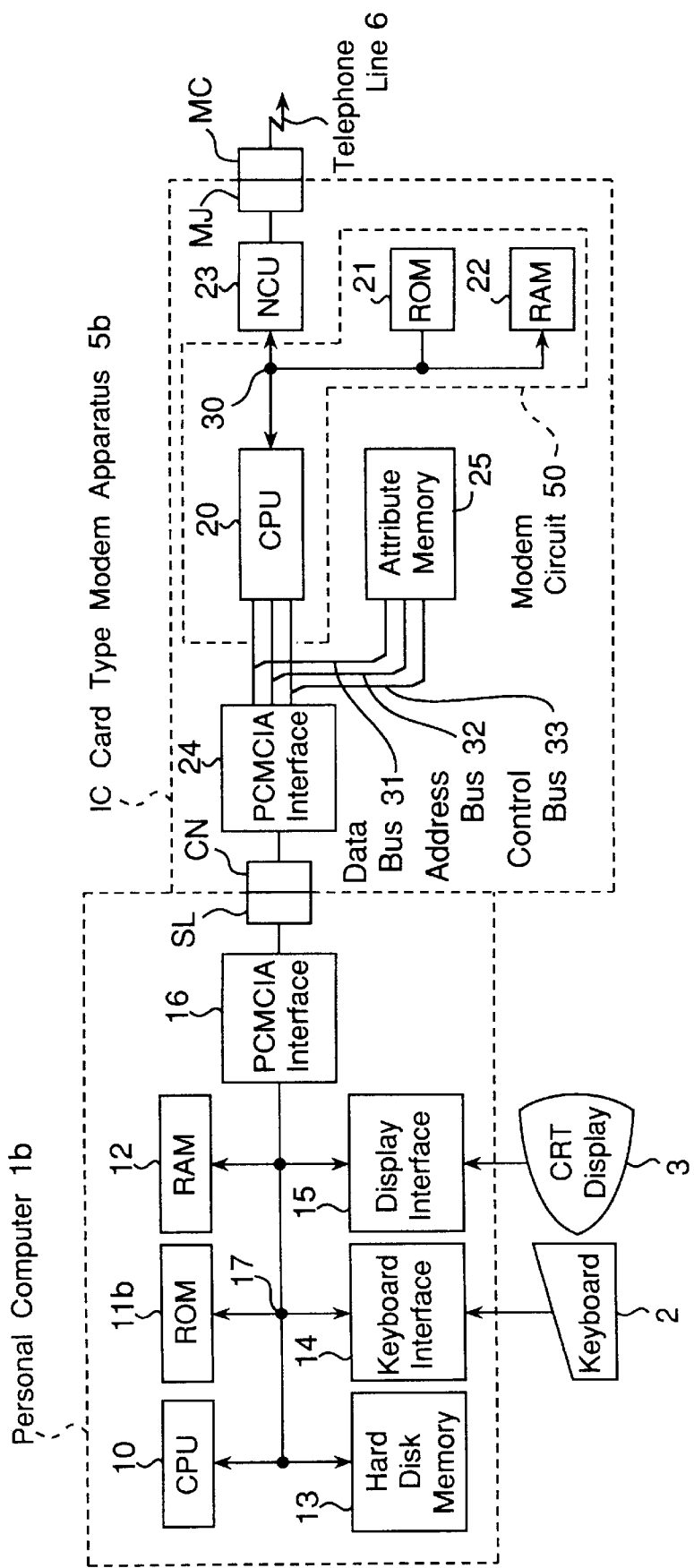
FIG. 4 is a block diagram showing a communication system which comprises a personal computer 1b and an IC card type modem apparatus 5b, and which is an example of the prior art.

FIG. 1 is a block diagram showing a communication system which comprises a personal computer 1 and an IC card (Integrated Circuit card) type modem apparatus 5, and which is a first preferred embodiment according to the present invention, and FIG. 2 is a block diagram showing the details of the communication system of the first preferred embodiment. In FIG. 1, the same components as those of the prior art example shown in FIG. 4 are designated by the same reference numerals.

In the communication system of this first preferred embodiment as shown in FIGS. 1 and 2, an IC card type modem apparatus (hereinafter, referred to as a modem apparatus) 5 includes a data memory 26 which has:

(a) a communication program memory 27 for storing a communication program; and (b) a telephone number list memory 28 for storing a telephone number list file including a plurality of telephone numbers of other parties. When the modem apparatus 5 is mounted into the personal computer 1, the CPU 10 of the personal computer 1 accesses the data memory 26 to read out the communication program and the telephone number list file from the data memory 26, and then, they are uploaded to the personal computer 1, and the CPU 10 stores them into the hard disk memory 13, then executes the communication program.

Referring to FIG. 1, the modem apparatus 5, which is, for example, a so-called facsimile modem PC card, is connected to the personal computer 1 through a connector CN of the modem apparatus 5 so that the connector CN is coupled with a slot SL which is provided at an insertion hole (not shown) formed in a side surface of the personal computer 1. In this case, the PC card refers to an IC card to be used so that the IC card is inserted and mounted into a personal computer. On the other hand, a modular connector MC, to which a telephone line 6 is connected, is coupled with a modular jack MJ which is provided to the modem apparatus 5. Further, a keyboard 2 and a CRT display 3 are connected to the personal computer 1.

FIG. 2 is a block diagram showing the details of the arrangement of FIG. 1. Referring to FIG. 2, the personal computer 1 includes:

(a) a CPU 10 for controlling an operation of the personal computer 1;

(b) a ROM 11 for storing a control program to control the operation of the personal computer 1 and data required for executing the control program;

(c) a RAM 12 to be used as a work area of the CPU 10;

(d) a hard disk memory 13 for storing a program of the operating system (OS) for the CPU 10 as well as various kinds of application programs which are executed under the program of the operating system, and data required for executing those programs;

(e) a keyboard interface 14 for executing an interfacing process, such as signal conversion and the like, between the CPU 10 and the keyboard 2;

(f) a display interface 15 for executing an interfacing process, such as signal conversion and the like, between the CPU 10 and the CRT display 3; and (g) a PCMCIA interface (hereinafter, referred to as an interface) 16 for executing an interfacing process, such as signal conversion and the like, between the CPU 10 and the modem apparatus 5, wherein these circuits 10 through 16 are connected to one another through a bus 17.

In the present preferred embodiment, there are stored in the ROM 11, a program for a card insertion and communication process as well as a program for a card withdrawal process, which will be described later. The interface 16 as well as a PCMCIA interface 24 provided in the modem apparatus 5 are so constituted as to comply with the standards specified in two documents titled "PC Card Standard, Release 2.0" and "Socket Service Interface Specification, Release 1.01", both of which were published by the Personal Computer Memory Card International Association (PCMCIA), in September 1991.

In a first preferred embodiment and the second preferred embodiment (described below), the CPU 10 performs an input process in association with the keyboard 2 and an input process through the interface 16 by way of predetermined interrupt processes, respectively.

On the other hand, the modem apparatus 5 comprises:

(a) a modem circuit 50 made up of a CPU 20, a ROM 21, and a RAM 22;

(b) an NCU circuit 23;

(c) the PCMCIA interface (hereinafter, referred to as an interface) 24;

(d) an attribute memory 25 in which the card electrical specifications of the modem apparatus 5 such as the memory storage capacity and the operating voltage have previously been stored; and (e) a data memory 26.

The attribute memory 25 is implemented by, for example, ROM, and the data memory 26 is implemented by non-volatile memory such as a flash memory, an EEPROM or the like. The CPU 20, the ROM 21, and the RAM 22 of the modem circuit 50 are connected to one another through a bus 30. The CPU 20, the attribute memory 25, and the data memory 26 are connected to the interface 24 through a data bus 31, an address bus 32, and a control bus 33, and are further connected to the CPU 10 through the interface 16 of the personal computer 1. The modem apparatus 5 is connected to the personal computer 1 through a connector CN of the modem apparatus 5 so that the connector CN is coupled with a slot SL which is provided at an insertion hole (not shown) formed in a side surface of the personal computer 1. On the other hand, a modular connector MC, to which a telephone line 6 is connected, is coupled with a modular jack MJ which is provided to the modem apparatus 5.

The modem circuit 50, which is provided in a form of, for example, an IC (Integrated Circuit), executes a control setting process within the modem circuit 50 in response to control data inputted from the CPU 10 of the personal computer 1 through the interface 24. On the other hand, the modem circuit 50 outputs the response data as well as control data corresponding to a line control signal derived from the NCU circuit 23, such as a ringing signal (calling-out signal) or the like, to the CPU 10 of the personal computer 1 through the interfaces 24 and 16. In another aspect, the modem circuit 50 modulates a carrier signal in accordance with signal data inputted from the CPU 10 of the personal computer 1 through the interfaces 16 and 24 so as to generate a modulated signal according to FSK, PSK, QAM or other digital modulation methods, and then, transmits the modulated signal to the telephone line 6 through the NCU circuit 23. On the other hand, the modem circuit 50 demodulates a modulated signal, which is received from the telephone line 6 through the NCU circuit 23, so as to generate signal data, and then outputs the demodulated signal data to the CPU 10 of the personal computer 1 through the interfaces 24 and 16.

The NCU circuit 23, which is provided in a form of, for example, an IC, is connected between the modular jack MJ and the CPU 20. The NCU circuit 23 executes an automatic off-hook or on-hook process for the telephone line 6 connected to the modular jack MJ through the modular connector MC, in response to the control data inputted from the CPU 10 of the personal computer 1 through the interfaces 16 and 24, and the modem circuit 50. Then the NCU circuit 23 generates a selection signal (numerical, pulsing, or dialing signal), which is a dial pulse signal (DP signal) or push button signal (PB signal or DTMF (Dual Tone Multi-Frequency) signal), and transmits the generated selection signal to the telephone line 6. The NCU circuit 23 has a ringing signal detection circuit, and the ringing signal detection circuit detects a ringing signal inputted through the telephone line 6, and in response to this, generates a detection signal of, for example, a high level, and transmits the detection signal to the modem circuit 50, thereby informing the modem circuit 50 of an incoming call. In response to this, the modem circuit 50 outputs control data showing a reception of the ringing signal to the CPU 10 of the personal computer 1 through the interfaces 24 and 16.

The data memory 26 of the modem apparatus 5 comprises, and is divided into, the communication program memory 27 for storing software of a communication program, and the telephone number list memory 28 for storing a telephone number list file including a plurality of telephone numbers of the other parties. The telephone number list file is provided for storing data, for example, in a format as shown in the following Table 1:

TABLE 1

| Serial No. | Name of the other party (Address Name or Destination Name) | Telephone Number |
|---|---|---|
| 1 | Mr. Akira Aoi | 06-123-4567 |
| 2 | Mr. Susumu Umeda | 03-9989-0912 |
| ... | ... | ... |
| ... | ... | ... |

Figure 6:
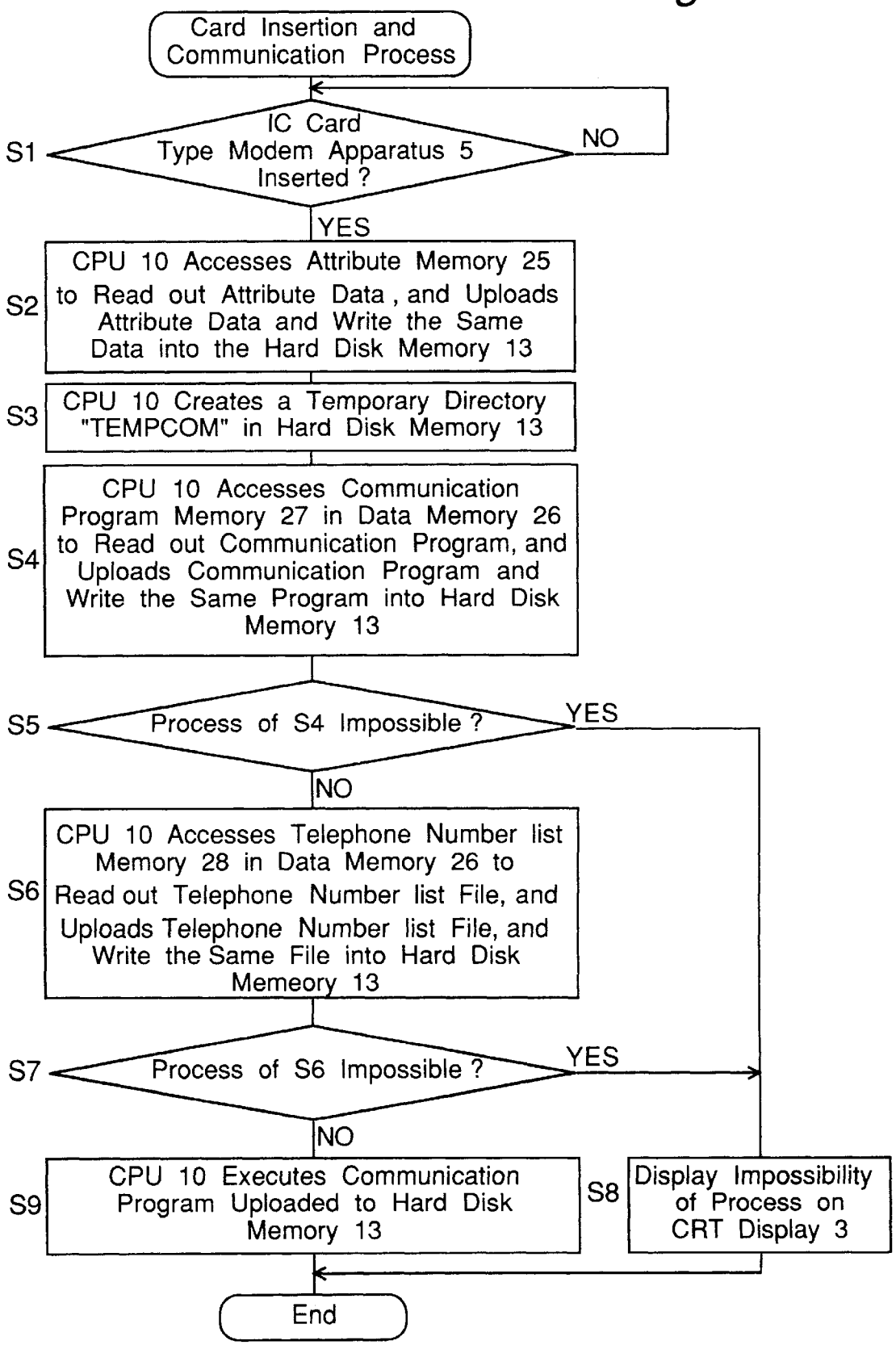
FIG. 6 is a flow chart showing a card insertion communication process which is executed by the CPU 10 of the personal computer 1 of FIGS. 1 and 2.

FIG. 6 is a flow chart showing a card insertion and communication process which is executed by the CPU 10 of the personal computer 1 of FIGS. 1 and 2.

Referring to FIG. 6, at step S1, it is first of all decided whether or not the modem apparatus 5 has been inserted and mounted into the personal computer 1. If the modem apparatus 5 has been mounted thereinto, at step S2, the CPU 10 accesses the attribute memory 25 provided within the modem apparatus 5 through the interfaces 16 and 24 to read out the attribute data from the attribute memory 25, and then, uploads the read-out attribute data to the personal computer 1 to write the attribute data into the hard disk memory 13. It is noted that the insertion or withdrawal of the modem apparatus 5 is detected by the interface 16, which then informs the CPU 10 of the insertion or withdrawal thereof. Next at step S3, the CPU 10 creates a temporary directory "TEMPCOM" in the hard disk memory 13. Then at step S4, the CPU 10 accesses the communication program memory 27 provided in the data memory 26 to read out the relevant communication program from the communication program memory 27, and uploads the communication program to the personal computer 1, then writes the uploaded communication program into the hard disk memory 13.

Further at step S5, it is decided whether or not the process of step S4 is possible to carry out. If the process of step S4 is impossible, the program flow goes to step S8. On the other hand, if the process of step S4 has been completed, at step S6 the CPU 10 accesses the telephone number list memory 28 provided in the data memory 26 to read out the telephone number data from the telephone number list memory 28, and then, uploads the read telephone number data to the personal computer 1 to write the same data into the hard disk memory 13. Then, at step S7, it is decided whether or not the process of step S6 is impossible to carry out. If the process of step S6 is impossible, the program flow goes to step S8, and then, the CPU 10 displays the impossibility onto the CRT display 3, then the card insertion and communication process is completed. On the other hand, if the process of step S6 has been completed at step S7, at step S9 the CPU 10 executes the communication program uploaded to the hard disk memory 13, and then, the communication process is carried out using the modem apparatus 5 in a manner which has been known to those skilled in the art. In this case, when an operator specifies the other party or destination party, with which the operator wishes to communicate, using the keyboard 2 among the other parties of the uploaded telephone number list file, the telephone number of the other party is dialed, and then, the modem apparatus 5 is connected with the apparatus of the other party through the telephone line 6, then a communication is carried out.

Figure 7:
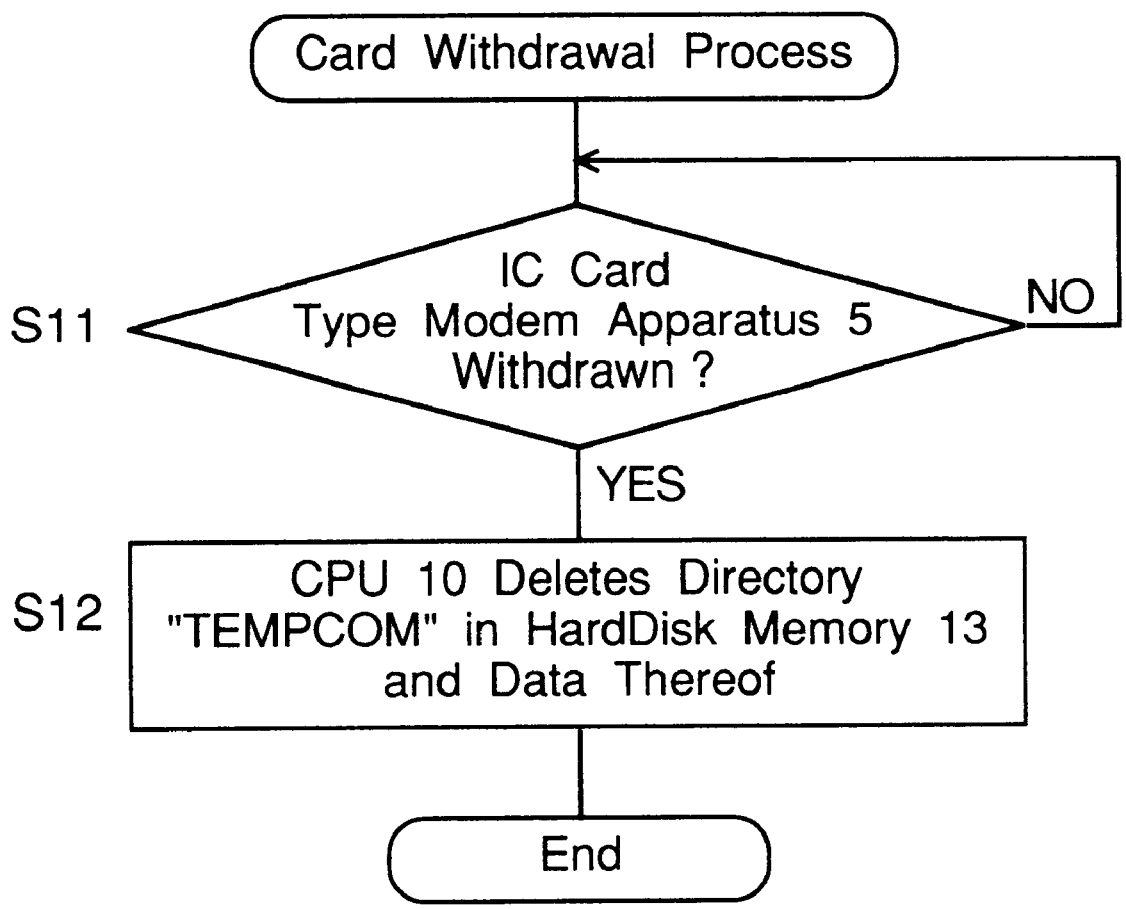
FIG. 7 is a flow chart showing a card withdrawal process which is executed by the CPU 10 of the personal computer 1 of FIGS. 1 and 2.

FIG. 7 is a flow chart showing a card withdrawal process which is executed by the CPU 10 of the personal computer 1 of FIGS. 1 and 2.

Referring to FIG. 7, at step S11, it is decided whether or not the modem apparatus 5 has been withdrawn from the personal computer 1. If the modem apparatus 5 has been withdrawn, at step S12 the CPU 10 deletes the directory "TEMPCOM" in the hard disk memory 13 and the data stored in the directory thereof, then the card withdrawal process is completed.

Figure 5A:
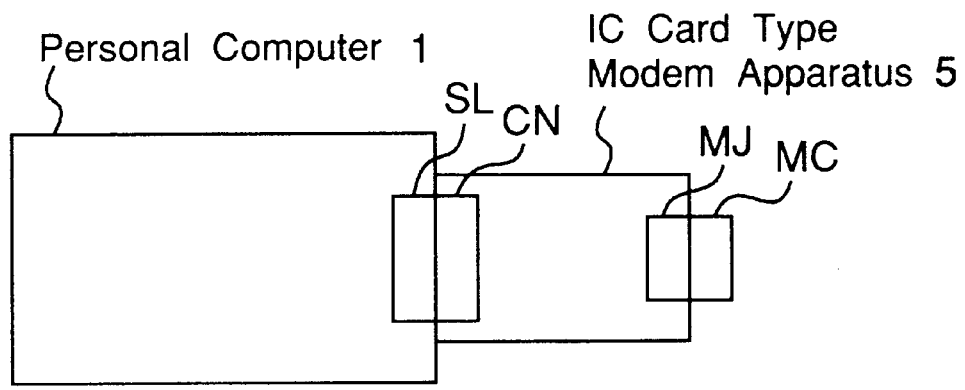
FIG. 5A is a block diagram showing a state of connection between the personal computer 1 and the IC card type modem apparatus 5 in the first preferred embodiment of FIGS. 1 and 2.

FIG. 5A is a block diagram showing a state of connection between the personal computer 1 and the IC card type modem apparatus 5 of the first preferred embodiment of FIGS. 1 and 2. FIG.s. 5B and 5C are block diagrams showing states of connections in which the IC card type modem apparatus 5 of the first preferred embodiment is inserted into and connected to the other personal computers 51 and 52, respectively.

Figure 5B:
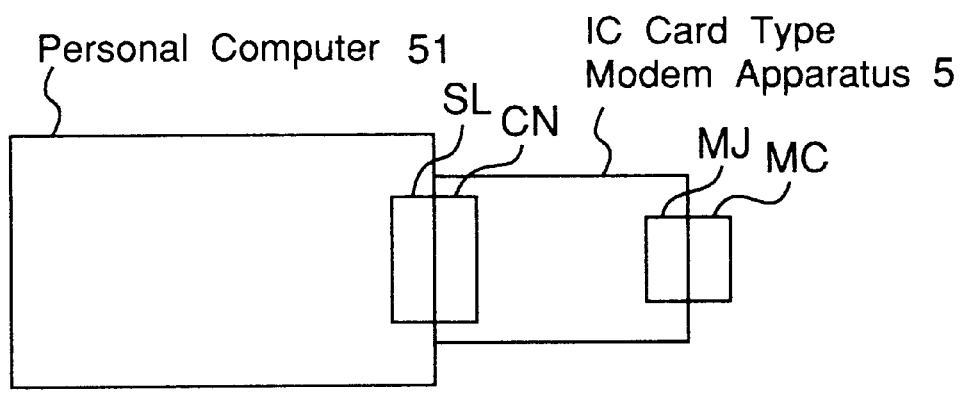
FIG. 5B is a block diagram showing a state of connection in which the IC card type modem apparatus 5 of the first preferred embodiment is inserted into and connected to the other personal computer 51.
Figure 5C:
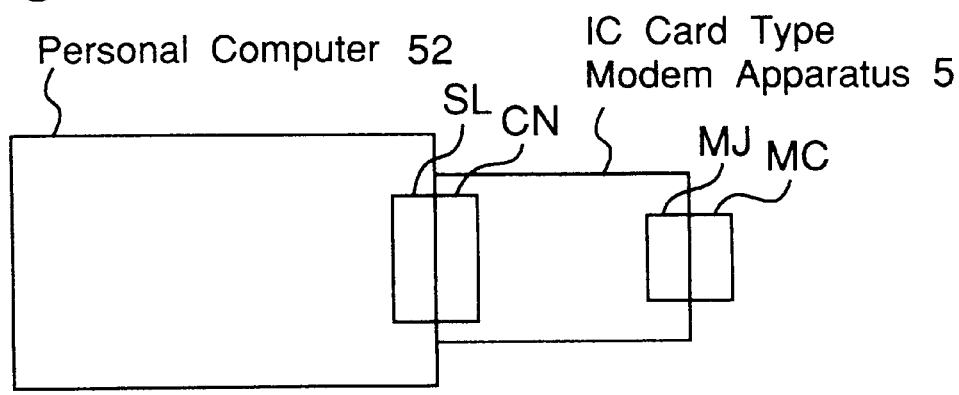
FIG. 5C is a block diagram showing a state of connection in which the IC card type modem apparatus 5 of the first preferred embodiment is inserted into and connected to the other personal computer 52.

The present preferred embodiment has such an advantageous effect that if the modem apparatus 5 is compatible with the other personal computers 51 and 52 in the sense that the modem apparatus 5 is operable when connected thereto as shown in FIGS. 5B and 5C, the same communication environment as that of FIG. 5A can be implemented so that the operator is allowed to carry out communication smoothly, even when the modem apparatus 5, which, for example is an IC card, is connected to the other personal computer 51 or 52, with greatly advantageous convenience for the operator.

As described above, according to the present preferred embodiment of the present invention, if the modem apparatus 5 of a facsimile modem PC card is carried, this allows the software of the operator's familiar communication program as well as the telephone number list file to be used independent of personal computers, without carrying any heavyweight, large-size personal computer. Thus, the communication environments for personal computer communications, Internet communications, and the like can be implemented smoothly.

Second Preferred embodiment

Figure 3:
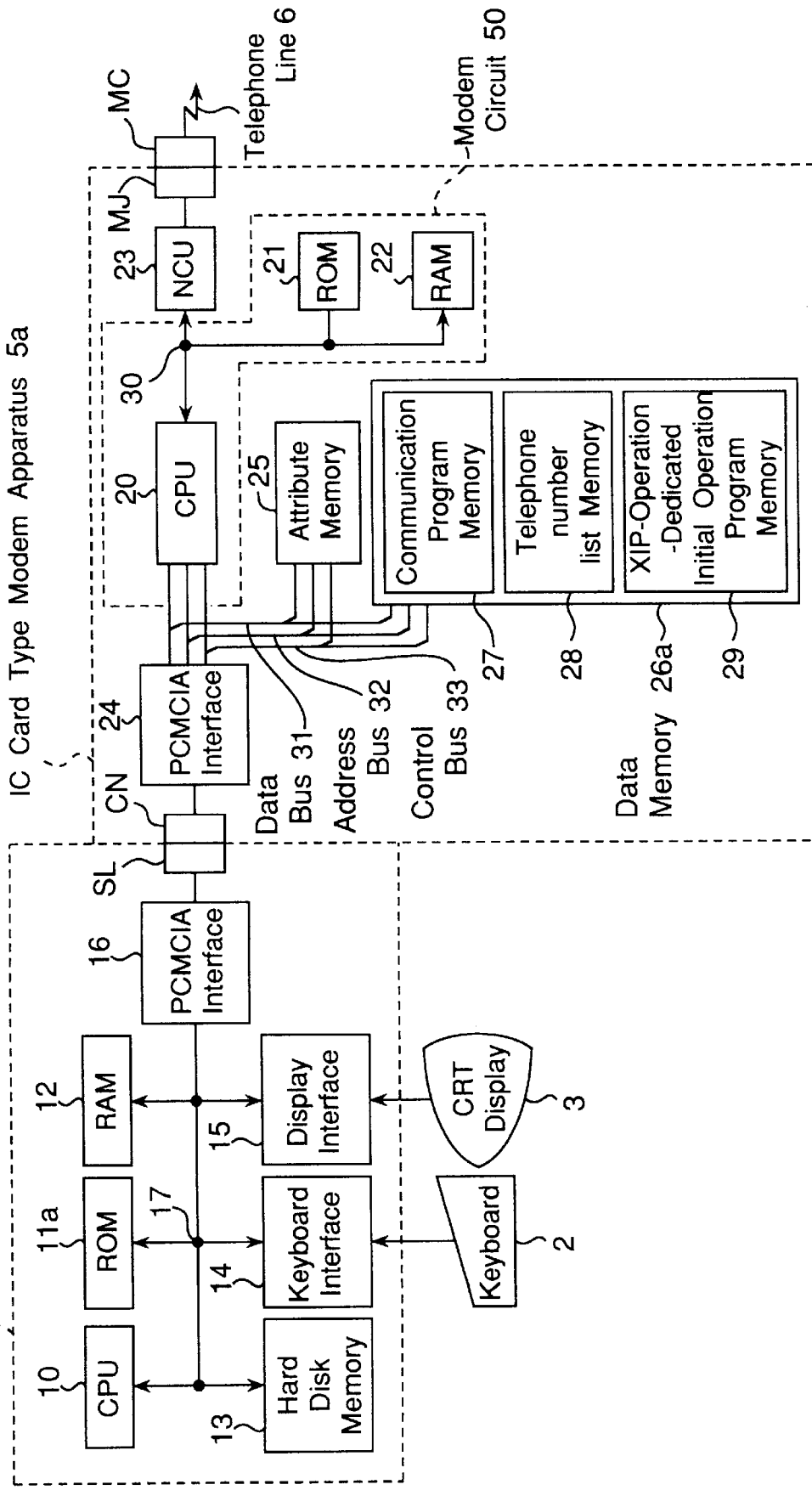
FIG. 3 is a-block diagram showing a communication system which comprises a personal computer 1a and an IC card type modem apparatus 5a, and which is a second preferred embodiment according to the present invention.

FIG. 3 is a block diagram showing a communication system which includes a personal computer 1a and an IC card type modem apparatus 5a, and which is a second preferred embodiment according to the present invention. In FIG. 3, the same components as those shown in FIGS. 2 and 4 are designated by the same reference numerals.

In the communication system of this second preferred embodiment, an IC card type modem apparatus (hereinafter, referred to as a modem apparatus) 5a includes a data memory 26a which has:

(a) a communication program memory 27 for storing the communication program;

(b) a telephone number list memory 28 for storing the telephone number list file including a plurality of telephone numbers of the other parties; and (c) an XIP-operation-dedicated initial operation program memory 29 for storing an initial operation program for use in an XIP operation. When the modem apparatus 5a is mounted into the personal computer 1a, the CPU 10 of the personal computer 1a accesses the data memory 26 to read out the XIP-operation-dedicated initial operation program from the data memory 26a, and uploads the read initial operation program to the personal computer 1a, then stores the same initial operation program into the hard disk memory 13. Then, the CPU 10 executes the XIP-operation-dedicated initial operation program, and accesses the data memory 26a in a form of the XIP to execute the communication program.

It is noted that the XIP is an abbreviation of "eXecute In Place", where a process in a form of XIP refers to a process for directly accessing the data memory 26a and executing the program stored in the data memory 26a without uploading any program or data from the data memory 26a of the modem apparatus 5a of an IC card, reading out a part of the data and transferring the same part of the data.

Figure 8:
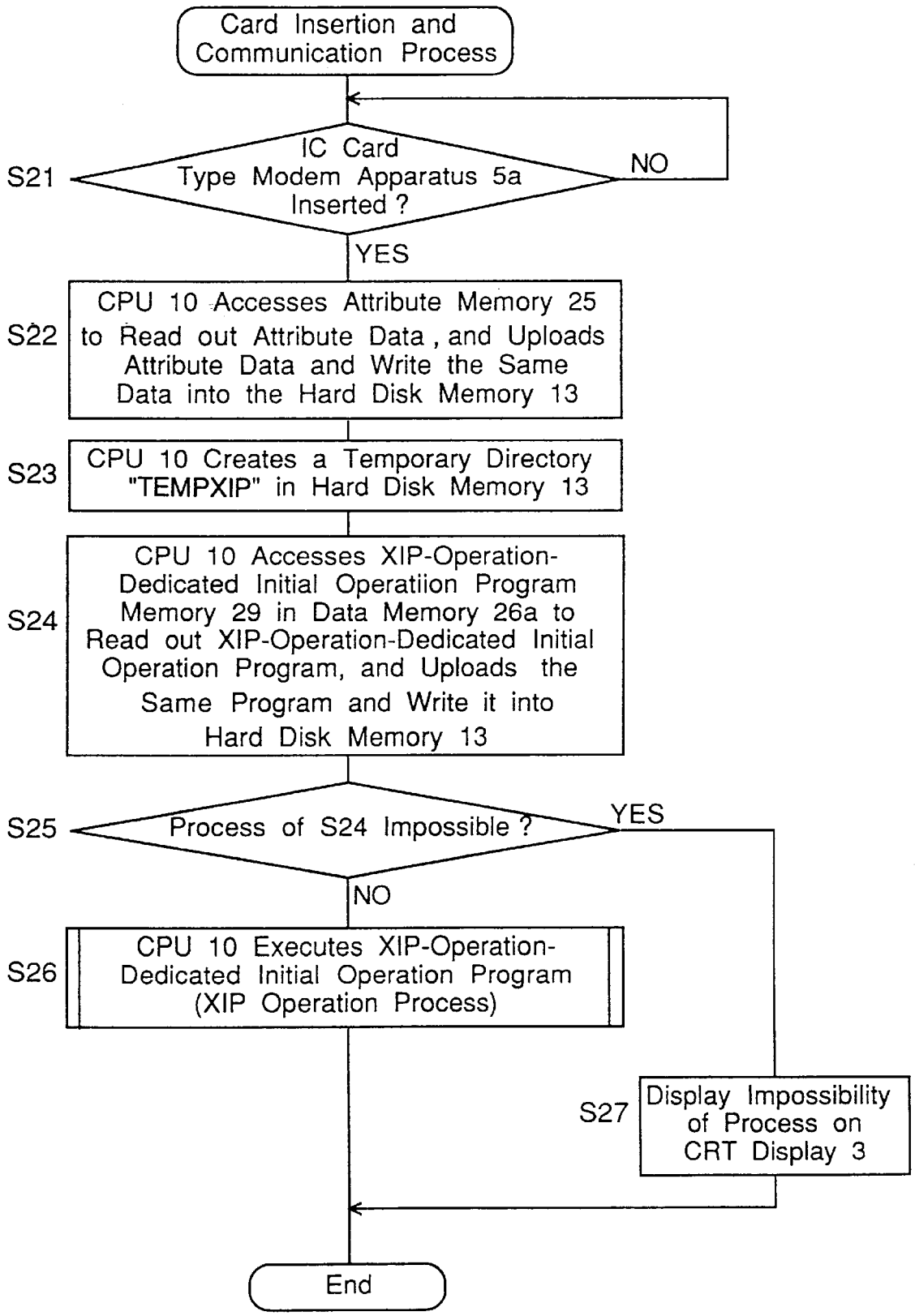
FIG. 8 is a flow chart showing a card insertion and communication process which is executed by the CPU 10 of the personal computer 1a of FIG. 3.
Figure 9:
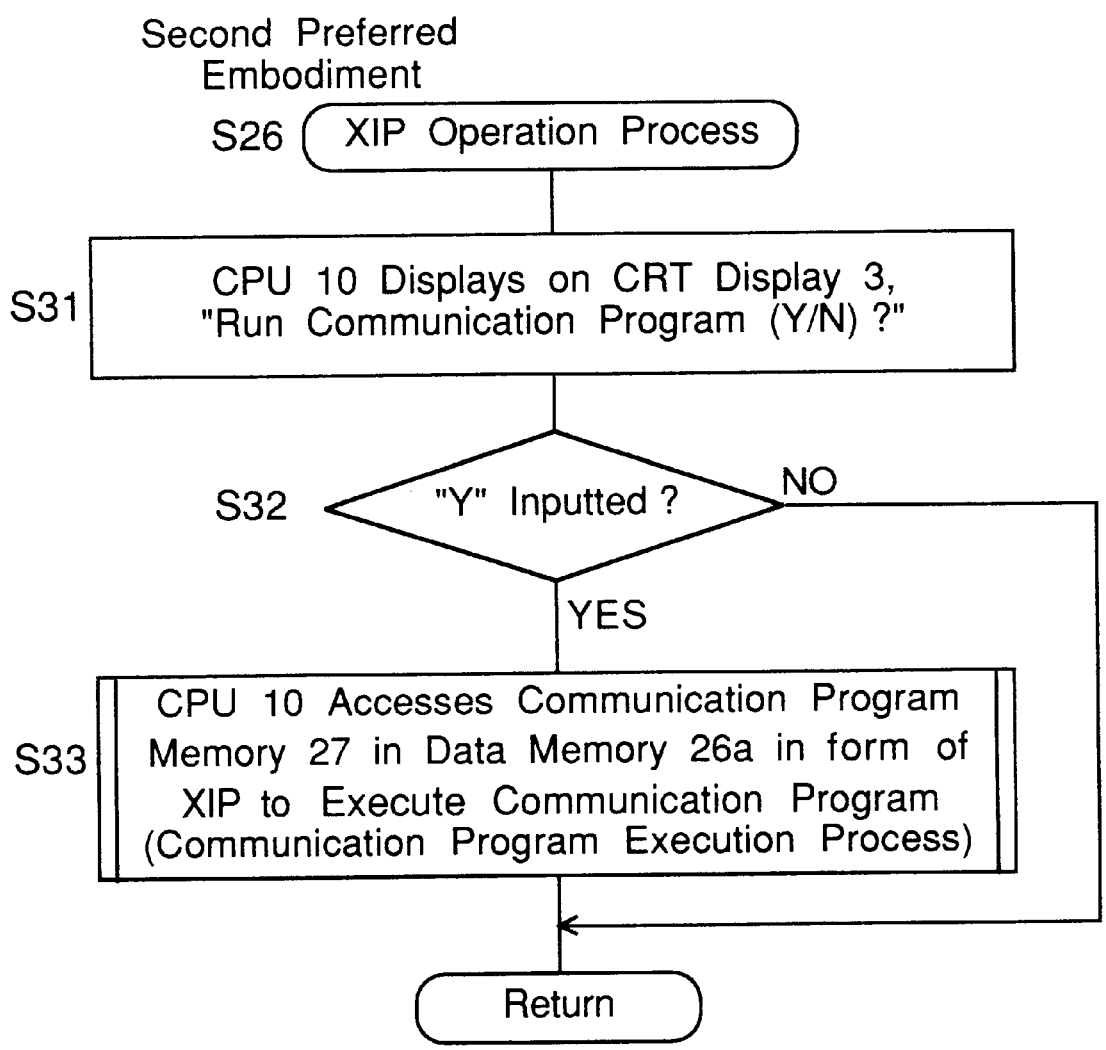
FIG. 9 is a flow chart showing an XIP operation process, which is a subroutine of the process of FIG. 8.
Figure 10:
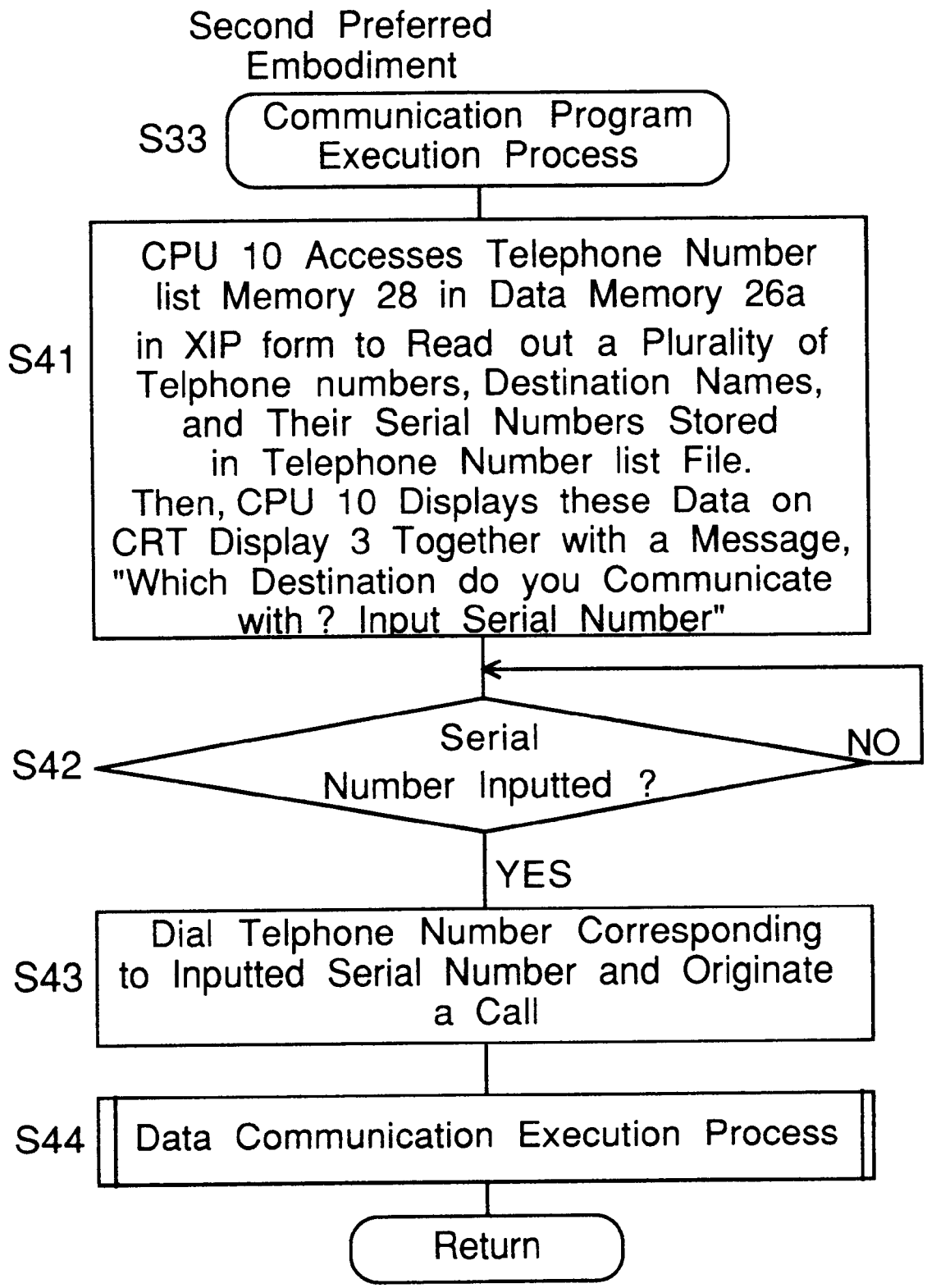
FIG. 10 is a flow chart showing a communication program execution process, which is a subroutine of the process of FIG. 9.
Figure 11:
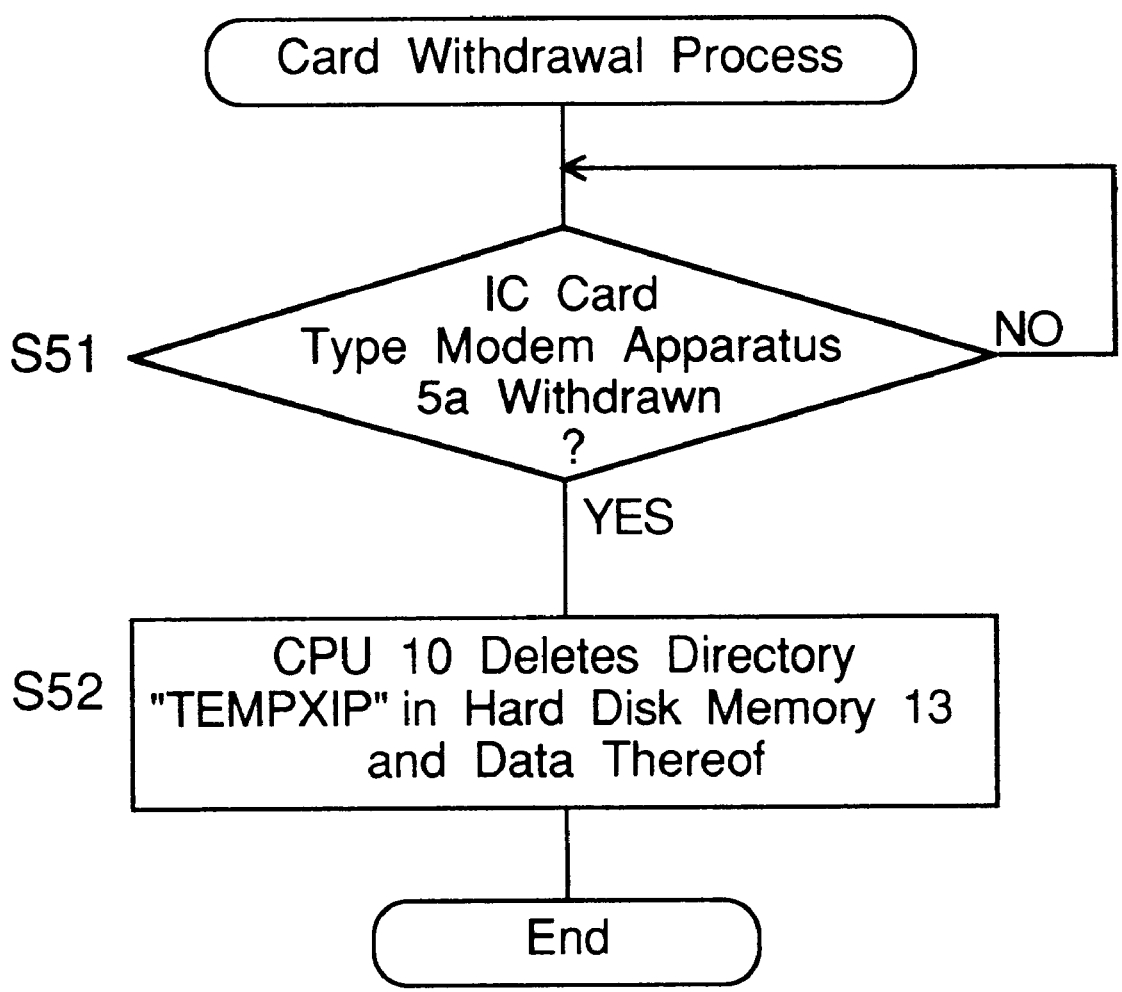
FIG. 11 is a flow chart showing a card withdrawal process which is executed by the CPU 10 of the personal computer 1a of FIG. 3.

The communication system of the second preferred embodiment of FIG. 3 differs from the communication system of the first preferred embodiment shown in FIG. 2 in the following points:

(a) the ROM 11a stores a control program and data for the card insertion and communication process of FIG. 8, the XIP operation process of FIG. 9, and the card withdrawal process of FIG. 11, where the communication program execution process of FIG. 10 is a process for the communication program stored in the communication program memory 27; and (b) the data memory 26a of the modem apparatus 5a includes an XIP-operation-dedicated initial operation program memory 29 for storing an XIP-operation-dedicated initial operation program, in addition to the communication program memory 27 and the telephone number list memory 28. Now the processes of the second preferred embodiment different from those of the first preferred embodiment are explained in detail below.

FIG. 8 is a flow chart showing a card insertion and communication process which is executed by the CPU 10 of the personal computer 1a of FIG. 3.

Referring to FIG. 8, at step S21, it is first of all decided whether or not the modem apparatus 5a has been inserted and mounted into the personal computer 1a. If the modem apparatus 5a has been mounted thereinto, at step S22 the CPU 10 accesses the attribute memory 25 provided within the modem apparatus 5a through the interfaces 16 and 24 to read out attribute data from the attribute memory 25, and uploads the read attribute data to the personal computer 1a and then writes the same attribute data into the hard disk memory 13. Next at step S23, the CPU 10 creates a temporary directory "TEMPXIP" in the hard disk memory 13. Then at step S24, the CPU 10 accesses the XIP-operation-dedicated initial operation program memory 29 in the data memory 26a to read out the relevant XIP-operation-dedicated initial operation program from the memory 29, uploads the initial operation program to the personal computer 1a and writes the same initial operation program into the hard disk memory 13.

Further at step S25, it is decided whether or not the process of step S24 is impossible to carry out. If the process of step S24 is impossible, the program flow goes to step S27, and then, the CPU 10 displays the impossibility onto the CRT display 3, and the card insertion and communication process is completed. On the other hand, if the process of step S24 has been completed, at step S26 the CPU 10 executes the XIP-operation-dedicated initial operation program (hereinafter, referred to as an XIP operation process), then the card insertion and communication process is completed.

FIG. 9 is a flow chart showing details of the XIP operation process of step S26, which is a subroutine of the process shown in FIG. 8.

Referring to FIG. 9, first of all, at step S31, the CPU 10 displays on the CRT display 3, "Run the communication program (Y/N)?" Next at step S32, it is decided whether or not a character "Y" has been entered or inputted using the keyboard 2. If the character "Y" has not been entered, the program flow directly returns to the main routine. On the other hand, if the character "Y" has been entered using the keyboard 2 at step S32, then at step S33 the CPU 10 accesses the communication program memory 27 in the data memory 26a directly in a form of XIP to execute the communication program (hereinafter, referred to as a communication program execution process). Then, the program flow returns to the main routine. FIG. 10 is a flow chart showing the communication program execution process of step S33, which is a subroutine of the process shown in FIG. 9.

Referring to FIG. 10, first of all, at step S41, the CPU 10 accesses the telephone number list memory 28 provided in the data memory 26a directly in a form of XIP to read out a plurality of telephone numbers of the other parties, address names or destination names, and their serial numbers which are stored in the telephone number list file. Then, the CPU 10 displays the read data on the CRT display 3 together with a message, "Which address do you communicate with? Enter a number." Next, at step S42, it is decided whether or not a number has been entered or inputted. If a number has been entered, at step S43 the CPU 10 dials the telephone number corresponding to the specified entered number to originate a call. Then, at step S44, the modem apparatus 5a is connected with the apparatus of the specified other party through the telephone line 6, a communication program for known data communication is executed, and then a communication process is carried out with the use of the modem apparatus 5a in a manner which has been known to those skilled in the art. In other words, a data communication execution process is performed at step S44. After step S44, the program flow returns to the main routine.

FIG. 11 is a flow chart showing the card withdrawal process which is executed by the CPU 10 of the personal computer 1a of FIG. 3.

Referring to FIG. 11, at step S51, it is decided whether or not the modem apparatus 5a has been withdrawn from the personal computer 1a. If the modem apparatus 5a has been withdrawn, at step S52 the CPU 10 deletes the directory "TEMPXIP" in the hard disk memory 13 and the data stored in the directory, then the card withdrawal process is completed.

In a manner similar to that of the first preferred embodiment, the present preferred embodiment also has such an advantageous effect that if the modem apparatus 5a is compatible with the other personal computers 51 and in the sense that the modem apparatus 5a is operable when connected thereto as shown in FIGS. 5B and 5C, the same communication environment as that of FIG. 5A can be implemented so that the operator is allowed to carry out the communication smoothly, even when the modem apparatus 5a, which is an IC card, is connected to the other personal computer 51 or 52, with greatly advantageous convenience for the operator.

Further, in the second preferred embodiment, since the personal computer 1a accesses the data memory 26a directly in the form of XIP to execute the communication program, any communication program is not occupied in the main memory of the RAM 12 of the personal computer 1a, so that it is unnecessary to provide a main memory having a large capacity in the personal computer 1a.

As described above, according to this preferred embodiment of the present invention, if the modem apparatus 5a of a facsimile modem PC card is carried, this allows the software of the operator's familiar communication program as well as the telephone number list file to be used independent of personal computers, without carrying any heavyweight, large-size personal computer. Thus, the communication environments for personal computer communications, Internet communications, and the like can be implemented smoothly.

Modified Preferred Embodiments

The above-mentioned preferred embodiments have been described with regard to IC card type modem apparatuses 5 and 5a . However, the present invention is not limited to this, and permits the use of the other types of modem apparatuses such as the desk top type or the like.

In the above-mentioned preferred embodiments, although the wire telephone line 6 has been used, the present invention is not limited to this, and may be so arranged that each of the modem apparatuses 5 and 5a is connected with another personal computer through a radio communication line using a portable telephone apparatus, radio LAN communication apparatus, or the like.

In the above-mentioned preferred embodiments, each of the modem apparatus 5 and 5a has the data communication function for performing data communication with a host computer of the other party, and the facsimile function for executing facsimile communication with a facsimile apparatus of the other party. However, the present invention is not limited to this, and may have either one function of the data communication function and the facsimile function. In the present preferred embodiments, for example, when the modem apparatus of a PC card is mounted into the other control units or controllers, similar communication environments can be implemented as shown in FIG. 5, so that the operator is allowed to carry out the communication smoothly, with greatly advantageous convenience for the operator. Therefore, if the modem apparatus is carried, this allows the software of the operator's familiar communication program as well as the telephone number list data to be used independent of control units or controllers, without carrying any heavyweight, large-size control unit or controller. Thus, the communication environments for personal computer communications, Internet communications, and the like can be implemented smoothly.

In the second preferred embodiment, since the communication program does not occupy the main memory of the control unit or controller, there can be obtained such an advantageous effect that the main memory is only required to have relatively small capacity.

Further, in the modem apparatus, preferably, the interface means executes the interfacing process in compliance with the PCMCIA specifications. As a result, the modem apparatus can be connected to any arbitrary control unit or controller manufactured in compliance with the PCMCIA specifications, so that the application range of the modem apparatus of the present invention can be substantially enlarged.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A modem apparatus comprising:

a modem circuit, operatively connected to a control unit external to the modem apparatus and a communication line, for modulating a carrier signal so as to generate a modulated signal according to signal data inputted from said control unit and transmitting the modulated signal through said communication line, and for demodulating a modulated signal received through said communication line so as to generate a signal data and outputting the signal data to said control unit;

first storage means for storing a communication program to be executed by said control unit;

second storage means for storing a telephone number list data including a plurality of telephone numbers of further parties which are used when the communication program is executed;

interface means for connecting said first storage means, said second storage means and said modem circuit to said control unit, and executing an interfacing process between said control unit and each of said first storage means, said second storage means and said modem circuit, wherein the first storage means and the second storage means are separate from a ROM and a RAM located in the modem apparatus; and third storage means for storing an initial operation program of said control unit for directly accessing said first and second storage means of said modem apparatus, executing the communication program stored in said first storage means, and reading out the telephone number list data from said second storage means, wherein said interface means connects said first storage means, said second storage means, said third storage means and said modem circuit, to said control unit, and executes an interfacing process between said control unit and each of said first storage means, said second storage means, said third storage means and said modem circuit.

2. The modem apparatus as claimed in claim 1, wherein said interface means executes the interfacing process in compliance with PCMCIA specifications.

3. A communication system comprising:

a modem apparatus; and a control unit external to the modem apparatus, wherein said modem apparatus comprises:

a modem circuit, operatively connected to said control unit and a communication line, for modulating a carrier signal so as to generate a modulated signal according to signal data inputted from said control unit and transmitting the modulated signal through said communication line, and for demodulating a modulated signal received through said communication line so as to generate signal data and outputting the signal data to said control unit;

first storage means for storing a communication program to be executed by said control unit;

second storage means for storing telephone number list data including a plurality of telephone numbers of further parties which are used when the communication program is executed;

third storage means for storing an initial operation program of said control unit for directly accessing said first and second storage means of said modem apparatus, executing the communication program stored in said first storage means, and reading out the telephone number list data from said second storage means;

interface means for connecting said first storage means, said second storage means, said third storage means and said modem circuit, to said control unit, and executing an interfacing process between said control unit and each of said first storage means, said second storage means, said third storage means and said modem circuit, wherein said control unit comprises:

fourth storage means; and control means for reading out the initial operation program from said third storage means, storing the initial operation program into said fourth storage means, executing the initial operation program, thereafter directly accessing said first and second storage means, executing the communication program stored in said first storage means, and reading out the telephone number list data from said second storage means.

4. The communication system as claimed in claim 3, wherein said interface means executes the interfacing process in compliance with PCMCIA specifications.

5. The modem apparatus as claimed in claim 3, wherein the telephone lists data includes a plurality of names corresponding to the plurality of telephone numbers.

6. The communication system of claim 3, wherein the initial operation program executes the communication program stored in said first storage means without uploading any of the communication program from the first storage means.

7. The communication system of claim 3, wherein the first storage means, the second storage means and the third storage means are separate from a ROM and a RAM located in the modem apparatus.

8. A method for interfacing a modem apparatus to a selected control unit external to the modem apparatus for use therewith, the modem apparatus including a modem circuit, a first storage unit and a second storage unit, wherein the first storage unit and the second storage unit are separate from a RAM and a ROM located in the modem apparatus, said method comprising:

(a) operatively connecting a modem circuit to the control unit and a communication line, said modem circuit modulating a carrier signal so as to generate a modulated signal according to signal data inputted from said control unit transmitting the modulated signal through said communication line, and demodulating a modulated signal received through said communication line so as to generate a signal data and outputting the signal data to said control unit;

(b) storing a communication program to be executed by said control unit in the first storage unit;

(c) storing telephone number list data including a plurality of telephone numbers of further parties which are used when the communication program is executed in the second storage unit;

(d) connecting said first storage unit, said second storage unit and said modem circuit to said control unit;

(e) executing an interfacing process between said control unit and each of said first storage unit, said second storage unit and said modem circuit; and (f) storing an initial operation program of said control unit, the initial operation program for:
  directly accessing said first and second storage units of said modem apparatus in a third storage unit;
  executing the communication program stored in said first storage unit; and
  reading out the telephone number list data from said second storage unit, wherein step (d) connects said first storage unit, said second storage unit, said third storage unit and said modem circuit, to said control unit, and step (e) executes an interfacing process between said control unit and each of said first storage unit, said second storage unit, said third storage unit and said modem circuit.

9. A method as claimed in claim 8 wherein step (e) executes the interfacing process in compliance with PCM-CIA specifications.

10. The method as claimed in claim 8 further comprising:
  reading out the communication program from said first storage unit;
  reading out the telephone number list data from said second storage unit;
  storing the communication program and the telephone number list data into a fourth storage unit located in said control unit; and
  executing the communication program stored in said fourth storage unit.

11. The method as claimed in claim 8 wherein the telephone lists data includes a plurality of names corresponding to the plurality of telephone numbers.

12. The method as claimed in claim 8, wherein the storing an initial operation program step executes the communication program stored in said first storage unit without uploading any of the communication program from the first storage unit.

* * * * *